(12) United States Patent
Wakabayashi

(10) Patent No.: US 11,708,905 B2
(45) Date of Patent: Jul. 25, 2023

(54) ELECTRIC PARKING LOCK APPARATUS

(71) Applicant: SUBARU CORPORATION, Tokyo (JP)

(72) Inventor: Kenta Wakabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/945,191

(22) Filed: Sep. 15, 2022

(65) Prior Publication Data

US 2023/0094168 A1    Mar. 30, 2023

(30) Foreign Application Priority Data

Sep. 24, 2021    (JP) .............................. JP2021-155275

(51) Int. Cl.
*F16H 63/34*    (2006.01)

(52) U.S. Cl.
CPC ..... *F16H 63/3475* (2013.01); *F16H 63/3433* (2013.01)

(58) Field of Classification Search
CPC ............. F16H 63/3475; F16H 63/3433; F16H 63/3491
See application file for complete search history.

(56) References Cited

U.S. PATENT DOCUMENTS

| 6,273,232 | B1 | 8/2001 | Kimura et al. | |
|---|---|---|---|---|
| 9,777,836 | B1* | 10/2017 | Lee | F16H 3/66 |
| 2007/0283735 | A1* | 12/2007 | Schweiher | F16H 63/483 70/245 |
| 2021/0180692 | A1* | 6/2021 | Kaiserauer | F16H 63/483 |
| 2021/0239212 | A1* | 8/2021 | Yoon | F16H 63/3475 |

FOREIGN PATENT DOCUMENTS

| JP | 2000-085552 A | 3/2000 |
|---|---|---|
| JP | 2018-065519 A | 4/2018 |

\* cited by examiner

*Primary Examiner* — Lori Wu
(74) *Attorney, Agent, or Firm* — McGinn I.P. Law Group, PLLC.

(57) ABSTRACT

An electric parking lock apparatus includes a parking mechanism, an electric actuator, an engagement member, a first urging member, and a first electromagnetic solenoid. The parking mechanism includes a parking gear and a parking pawl. The engagement member includes first and second engagement elements. The first engagement element includes a proximal end coupled to the first urging member. The second engagement element includes a proximal end coupled to a brake pedal of the vehicle. In a state of power supply failure, the first electromagnetic solenoid allows the first engagement element to swing in the direction for engaging with the second engagement element. In the state of power supply failure, the engagement elements engage with each other when the brake pedal is released from a depressed state, and the parking pawl is caused to swing in a direction for engaging with the parking gear as the brake pedal is released.

12 Claims, 3 Drawing Sheets

ELECTRIC PARKING LOCK APPARATUS

CROSS-REFERENCE TO RELATED APPLICATIONS

The present application claims priority from Japanese Patent Application No. 2021-155275 filed on Sep. 24, 2021, the entire contents of which are hereby incorporated by reference.

BACKGROUND

The disclosure relates to an electric parking lock apparatus.

An automatic transmission according to the related art includes a parking lock apparatus that locks a parking gear fitted to an output shaft of the automatic transmission when a parking (P) range is selected. In recent years, automatic transmissions including a shift-by-wire (SBW) mechanism have been commercialized. In such an automatic transmission, a range selected by a driver is detected with a switch or the like, and the shift-by-wire (SBW) mechanism changes a range of the automatic transmission by driving an electric actuator, such as an electric motor, based on the result of the detection.

When, for example, the P range is selected, the electric shift-by-wire mechanism (parking lock apparatus including an electric actuator) drives the electric actuator, such as an electric motor, to swing a parking pawl and lock the parking gear. When a range other than the P range is selected, the electric actuator, such as an electric motor, is driven to unlock the parking gear.

In an electric parking lock apparatus, there is a possibility that parking lock cannot be released if a power supply failure occurs while the parking gear is locked. The power supply failure may occur due to, for example, an abnormality in a battery, disconnection or short-circuiting of a power supply line (harness), or a rupture of a main fuse. Accordingly, for example, Japanese Unexamined Patent Application Publication (JP-A) No. 2018-65519 and Japanese Unexamined Patent Application Publication (JP-A) No. 2000-85552 propose electric parking lock apparatuses including a manual lock releaser that enables a manual operation for releasing the parking lock when a power supply failure occurs.

SUMMARY

An aspect of the disclosure provides an electric parking lock apparatus including a parking mechanism, an electric actuator, an engagement member, a first urging member, and a first electromagnetic solenoid. The parking mechanism includes a parking gear and a parking pawl and is configured to lock the parking gear by engaging the parking pawl with the parking gear to set a vehicle to a parking state. The electric actuator is configured to swing the parking pawl to lock the parking gear. The engagement member includes a first engagement element and a second engagement element in pairs that are engageable with each other. The first urging member is provided at a distal end of the parking pawl, and configured to apply an urging force to the first engagement element so that the first engagement element swings in a direction for engaging with the second engagement element. In an energized state, the first electromagnetic solenoid is configured to retain the first engagement element against the urging force of the first urging member so that the first engagement element does not swing. The first engagement element includes a proximal end coupled to the first urging member. The second engagement element includes a proximal end coupled to a brake pedal of the vehicle. In a state of power supply failure, the first electromagnetic solenoid allows the first engagement element to swing in the direction for engaging with the second engagement element in response to the urging force of the first urging member. In the state of power supply failure, the first engagement element and the second engagement element engage with each other in a case where the brake pedal is released from a depressed state, and the parking pawl is caused to swing in a direction for engaging with the parking gear as the brake pedal is released from the depressed state.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

A power supply failure may occur while the parking gear is not locked, that is, in an unlocked state. In such a case, there is a possibility that the electric actuator, such as an electric motor, cannot be driven, and the parking gear cannot be locked. However, JP-A No. 2018-65519 and JP-A No. 2000-85552 do not describe any operation of locking the parking gear when a power supply failure occurs in the unlocked state.

It is desirable to provide an electric parking lock apparatus capable of semi-automatically locking a parking gear if a power supply failure occurs while the parking gear is not locked (unlocked state).

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
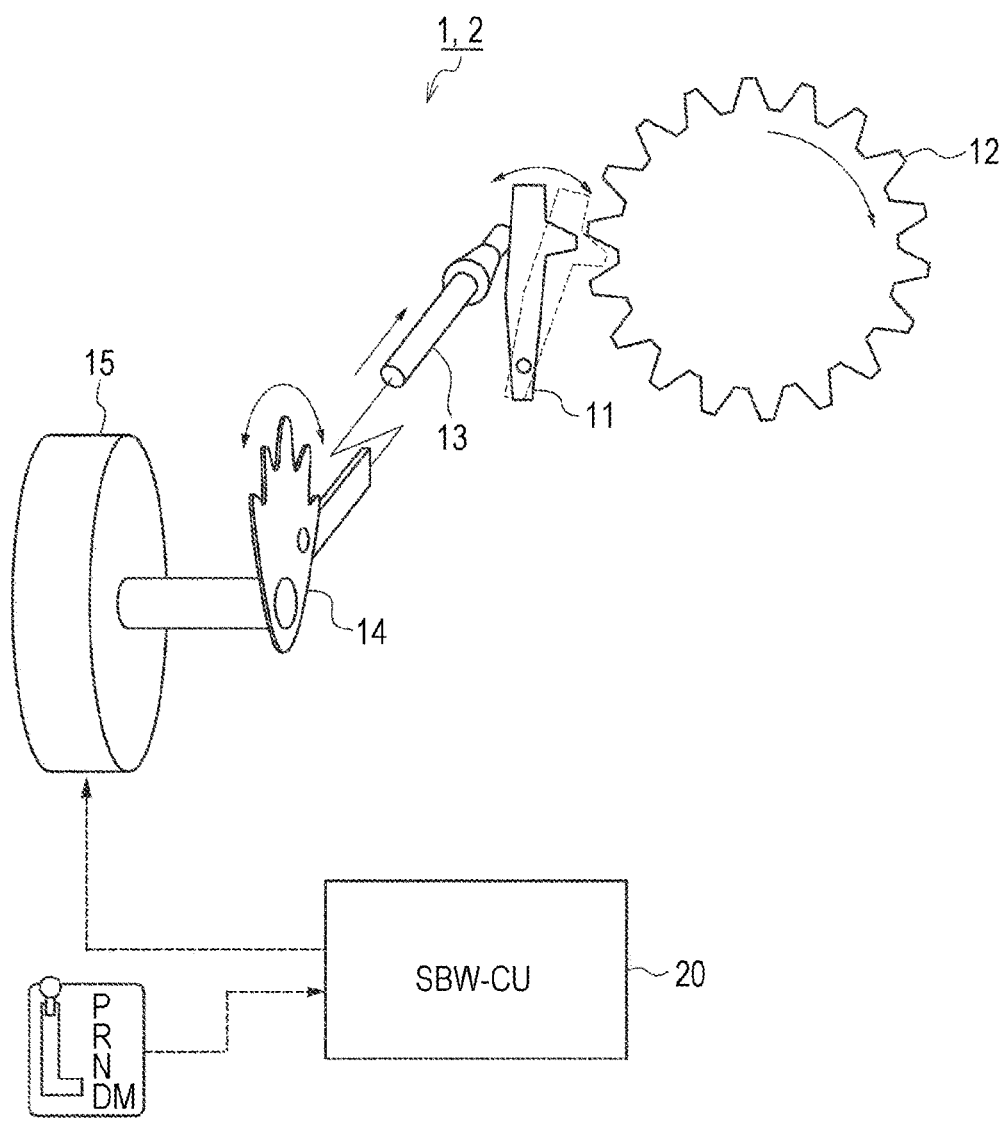
FIG. 1 illustrates the configuration of a shift-by-wire mechanism included in an electric parking lock apparatus according to an embodiment.
Figure 2:
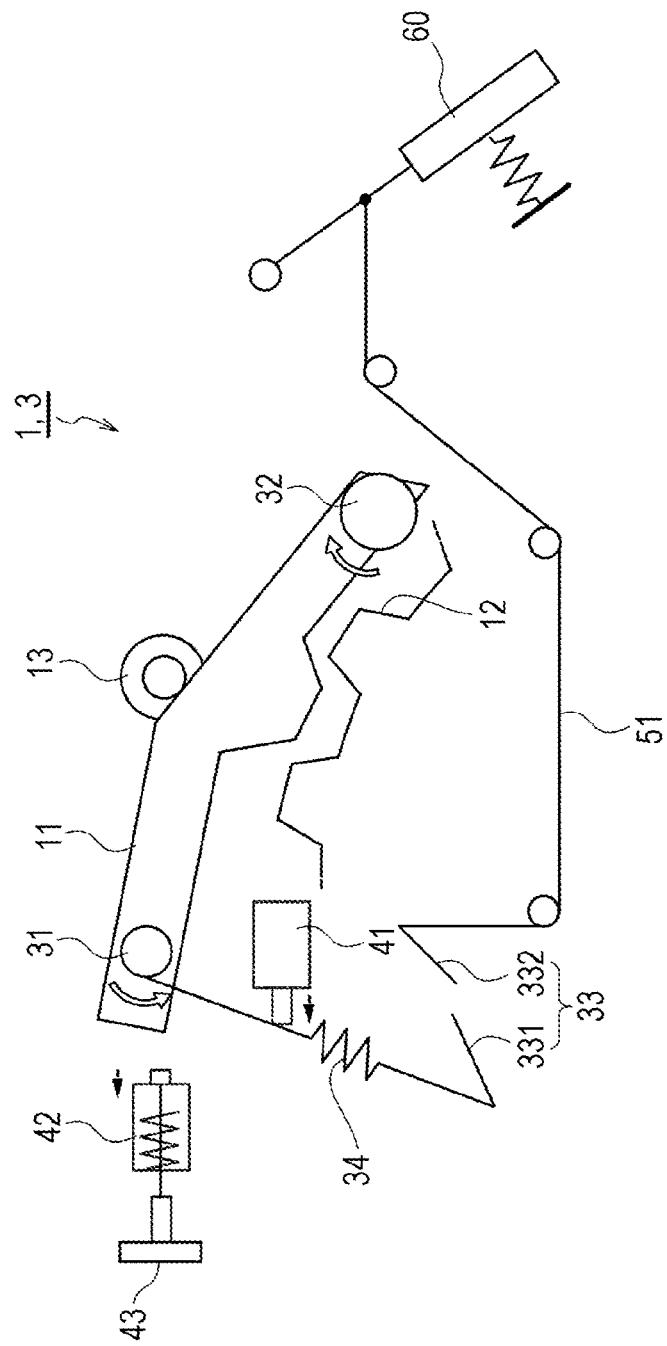
FIG. 2 is a schematic diagram illustrating the configuration of a lock mechanism for use in a state of power supply failure in the electric parking lock apparatus according to the embodiment (normal power supply state (energized state))
Figure 3:
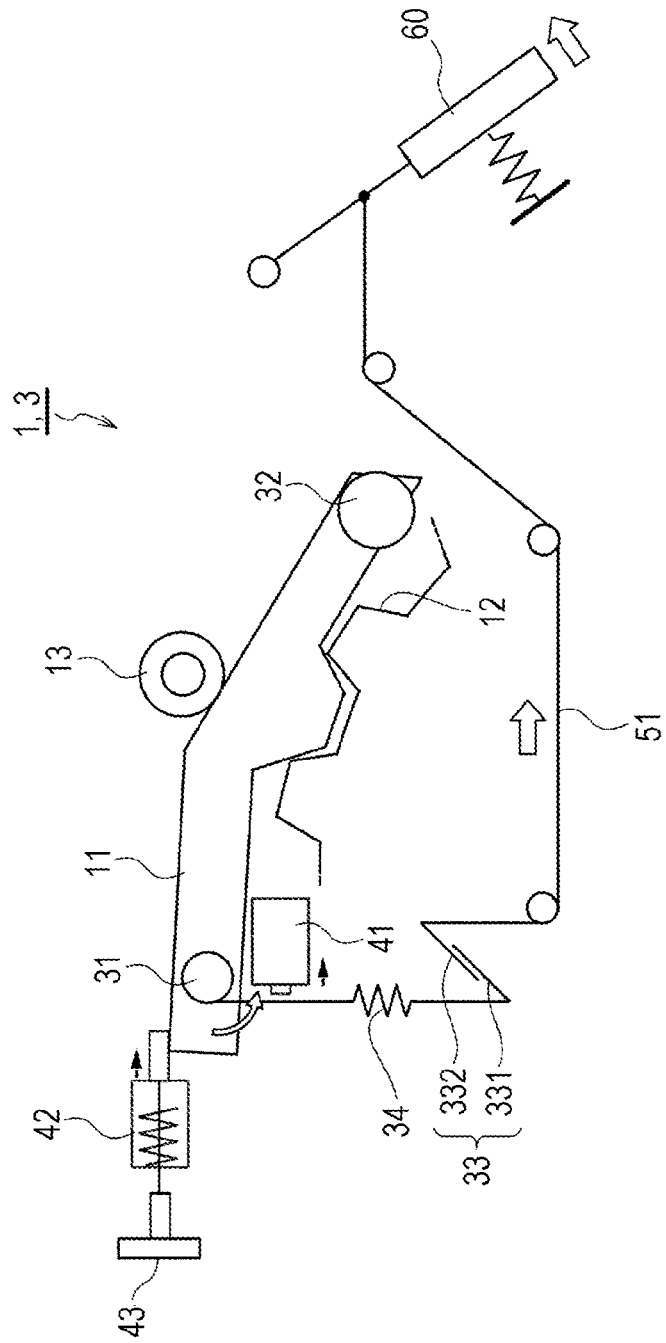
FIG. 3 is a schematic diagram illustrating the configuration of the lock mechanism for use in the state of power supply failure in the electric parking lock apparatus according to the embodiment (state of power supply failure (non-energized state)).

The configuration of an electric parking lock apparatus 1 according to an embodiment will be described with reference to FIGS. 1 to 3. FIG. 1 illustrates the configuration of a shift-by-wire mechanism 2 included in the electric parking lock apparatus 1. FIG. 2 is a schematic diagram illustrating the configuration of a lock mechanism 3 for use in a state of power supply failure in the electric parking lock apparatus 1 (normal power supply state (energized state)). FIG. 3 is a schematic diagram illustrating the configuration of the lock mechanism 3 for use in the state of power supply failure in the electric parking lock apparatus 1 (state of power supply failure (non-energized state)).

When a parking (P) range is selected, the shift-by-wire mechanism (parking mechanism) 2 included in the electric parking lock apparatus 1 locks rotation of an automatic transmission so that wheels do not rotate. Referring to FIG. 1, a shift-by-wire control unit (hereinafter referred to as "SBW-CU") 20 drives an electric actuator 15 (for example, an electric motor) having an output shaft to which a detent plate 14 is attached. The detent plate 14 is coupled to a parking rod 13 that is movable back and forth in an axial direction. A parking gear 12 is spline-fitted to, for example, an output shaft of the automatic transmission. The parking gear 12 is provided with a parking pawl 11 that is swingable to engage with the parking gear 12.

When the parking (P) range is selected, the electric actuator 15 (electric motor) is rotated to swing the detent plate 14 so that the parking rod 13 moves in the axial direction. Accordingly, a tapered unit of the parking rod 13 pushes the parking pawl 11 from behind, so that the parking pawl 11 swings and engages with the parking gear 12. As a result, rotation of the automatic transmission is locked. When the vehicle is moving at a speed higher than or equal to a predetermined speed, the parking pawl 11 is snapped back by the parking gear 12 and cannot engage with the parking gear 12.

If a power supply failure occurs due to, for example, an abnormality in a battery, disconnection or short-circuiting of a power supply line (harness), or a rupture of a main fuse, there is a possibility that the SBW-CU 20 and the electric actuator 15 described above cannot be operated. In other words, there is a possibility that the parking gear 12 cannot be locked or unlocked (released from a locked state). The electric parking lock apparatus 1 has a function of semi-automatically locking the parking gear 12 (parking lock) when a power supply failure occurs while the parking gear 12 is not locked (unlocked state).

The electric parking lock apparatus 1 includes the lock mechanism 3 for use in the state of power supply failure. As illustrated in FIGS. 2 and 3, the lock mechanism 3 for use in the state of power supply failure mainly includes a first urging member 31, a second urging member 32, an engagement member 33, an elastic member 34, a first electromagnetic solenoid 41, and a second electromagnetic solenoid 42.

The engagement member 33 includes a pair of engagement elements 331 and 332 (first engagement element 331 and second engagement element 332) engageable with each other. The first engagement element (engagement lug) 331 and the second engagement element (engagement lug) 332 each have a distal end that is hook-shaped or wedge-shaped, for example. When the outer surfaces of the distal ends of the first and second engagement elements 331 and 332 are in contact with each other, for example, when a power supply failure occurs while a brake pedal 60 is not depressed, the first and second engagement elements 331 and 332 are movable (slidable) along contact surfaces thereof.

A proximal end of the first engagement element 331 is coupled to a first urging member 31 provided at a distal end of the parking pawl 11. A proximal end of the second engagement element 332 is coupled to the brake pedal 60 with a wire 51.

An elastic member 34 that is expandable and contractible (for example, a coil spring) is disposed between the proximal end of the first engagement element 331 and the first urging member 31 provided at the distal end of the parking pawl 11. A contraction force (spring force) of the elastic member 34 is greater than an urging force of the second urging member 32. The contraction force (spring force) of the elastic member 34 is set so that the elastic member 34 expands and does not lock the parking gear 12 when the parking pawl 11 is snapped back by the parking gear 12.

The first urging member 31 is composed of, for example, a coil spring and is provided at the distal end of the parking pawl 11. The first urging member 31 applies an urging force to the first engagement element 331 of the engagement member 33 so that the first engagement element 331 swings in a direction for engaging with (approaching) the second engagement element 332.

In a normal power supply state (energized state), a plunger, for example, of the first electromagnetic solenoid 41 projects outward. Accordingly, the first engagement element 331 is retained against the urging force of the first urging member 31 so that the first engagement element 331 does not swing. Thus, the first and second engagement elements 331 and 332 are restrained from engaging with each other.

In the state of power supply failure (non-energized state), the plunger of the first electromagnetic solenoid 41 is retracted (contained) in the first electromagnetic solenoid 41. Accordingly, the first engagement element 331 is enabled to swing in a direction for engaging with (approaching) the second engagement element 332 in response to the urging force of the first urging member 31. In other words, the first and second engagement elements 331 and 332 are enabled to engage with each other. Therefore, the pair of engagement elements 331 and 332 engage with each other when the brake pedal 60 is released from a depressed state in the state of power supply failure (non-energized state). As the brake pedal 60 is released from a depressed state, that is, as the brake pedal 60 returns to a brake pedal position, the parking pawl 11 is pulled by the wire 51 and caused to swing in a direction for engaging with the parking gear 12.

The second urging member 32 is composed of, for example, a coil spring and is provided at a proximal end of the parking pawl 11 (swing center axis). The second urging member 32 applies an urging force to the parking pawl 11 in a direction such that the parking pawl 11 moves away from the parking gear 12, that is, such that the lock is released.

In the normal power supply state (energized state), a plunger, for example, of the second electromagnetic solenoid 42 is retracted (contained) in the second electromagnetic solenoid 42. Accordingly, the parking pawl 11 is enabled to move away from the parking gear 12 (lock can be released) in response to the urging force of the second urging member 32. In the state of power supply failure (non-energized state), the plunger of the second electromagnetic solenoid 42 projects outward. Accordingly, the parking pawl 11 is retained against the urging force of the second urging member 32 so that the parking pawl 11 is retained in a parking lock state (engaged with the parking gear 12).

The electric parking lock apparatus 1 also includes a release member (release lever) 43 that mechanically cancels the parking state maintained by the second electromagnetic solenoid 42 in the state of power supply failure (non-energized state). In one example, the release member 43 is coupled to the plunger of the second electromagnetic solenoid 42 with a wire or the like. When the release member 43 is pulled, the plunger of the second electromagnetic solenoid 42 is pulled (retracted) into the second electromagnetic solenoid 42. As a result, the parking pawl 11 moves away from the parking gear 12 in response to the urging force of the second urging member 32, and the lock is released.

According to the above-described configuration, in the state of power supply failure, as illustrated in FIG. 3, the plunger of the first electromagnetic solenoid 41 is pulled (retracted) into the first electromagnetic solenoid 41. Accordingly, the first engagement element 331 is enabled to swing in the direction for engaging with the second engagement element 332 in response to the urging force of the first urging member 31.

The proximal end of the first engagement element 331 is coupled to the first urging member 31 provided at the distal end of the parking pawl 11, and the proximal end of the second engagement element 332 is coupled to the brake pedal 60 with the wire 51. Therefore, when the brake pedal 60 is released from the depressed state afterwards, the pair of engagement elements 331 and 332 engage with each other, and the parking pawl 11 swings in the direction for engaging with the parking gear 12 as the brake pedal 60 is released from the depressed state. As a result, the parking gear 12 is locked (parking lock) in response to releasing of the brake pedal 60 from the depressed state, that is, semi-automatically.

In the state of power supply failure, the plunger of the second electromagnetic solenoid 42 projects outward. Accordingly, the parking pawl 11 is retained in the parking lock state against the urging force of the second urging member 32. Even in the state of power supply failure, when the release member 43 is pulled, the plunger of the second electromagnetic solenoid 42 is pulled (retracted) into the second electromagnetic solenoid 42. Accordingly, the parking pawl 11 moves away from the parking gear 12 in response to the urging force of the second urging member 32, and the lock is released.

In the normal power supply state (energized state), as illustrated in FIG. 2, the plunger of the second electromagnetic solenoid 42 is retracted (contained) in the second electromagnetic solenoid 42, and the plunger of the first electromagnetic solenoid 41 projects outward. Therefore, the parking pawl 11 is enabled to swing, and the first engagement element 331 is retained against the urging force of the first urging member 31 so that the first engagement element 331 does not swing, that is, so that the first and second engagement elements 331 and 332 do not engage with each other. Therefore, as described above, the parking gear 12 is locked or unlocked in response to an operation of the electric actuator 15.

As described above, according to the present embodiment, in the state of power supply failure, the first engagement element 331 is enabled to swing in the direction for engaging with the second engagement element 332 in response to the urging force of the first urging member 31. The proximal end of the first engagement element 331 is coupled to the first urging member 31 provided at the distal end of the parking pawl 11, and the proximal end of the second engagement element 332 is coupled to the brake pedal 60 with the wire 51. Therefore, when the brake pedal 60 is released from the depressed state afterwards, the pair of engagement elements 331 and 332 engage with each other, and the parking pawl 11 swings in the direction for engaging with the parking gear 12 as the brake pedal 60 is released from the depressed state (return to the brake pedal position). As a result, even when a power supply failure occurs while the parking gear 12 is not locked (unlocked state), the parking gear 12 can be semi-automatically locked by releasing the brake pedal 60 from the depressed state.

In the normal power supply state (energized state), the plunger of the second electromagnetic solenoid 42 is retracted (contained) in the second electromagnetic solenoid 42, and the plunger of the first electromagnetic solenoid 41 projects outward. Therefore, the parking pawl 11 is enabled to swing, and the first engagement element 331 is retained against the urging force of the first urging member 31 so that the first engagement element 331 does not swing, that is, so that the first and second engagement elements 331 and 332 do not engage with each other. Therefore, the parking gear 12 is locked or unlocked in response to an operation of the electric actuator 15.

According to the present embodiment, the first and second engagement elements 331 and 332 each have a hook-shaped or wedge-shaped distal end. When the outer surfaces of the distal ends of the first and second engagement elements 331 and 332 are in contact with each other, for example, when a power supply failure occurs while a brake pedal 60 is not depressed, the first and second engagement elements 331 and 332 are movable along contact surfaces thereof. Therefore, even when a power supply failure occurs while the brake pedal 60 is not depressed, the parking lock can be set by depressing the brake pedal 60 and then releasing the brake pedal 60 from the depressed state.

According to the present embodiment, the second urging member 32 and the second electromagnetic solenoid 42 are provided. The second urging member 32 applies an urging force to the parking pawl 11 in a direction such that the parking pawl 11 moves away from the parking gear 12. In the energized state, the second electromagnetic solenoid 42 enables the parking pawl 11 to move away from the parking gear 12 in response to the urging force of the second urging member 32. In the state of power supply failure, the second electromagnetic solenoid 42 retains the parking pawl 11 in the parking lock state against the urging force of the second urging member 32. Therefore, even when a power supply failure occurs, the parking lock state can be maintained against the urging force of the second urging member 32.

According to the present embodiment, the expandable and contractible elastic member 34 is also provided. The elastic member 34 is disposed between the proximal end of the first engagement element 331 and the first urging member 31 provided at the distal end of the parking pawl 11. The contraction force of the elastic member 34 is greater than the urging force of the second urging member 32. Therefore, for example, when a power supply failure occurs while the vehicle is moving and when the parking pawl 11 is snapped back by the parking gear 12, the elastic member 34 expands to prevent the parking gear 12 from being locked. When the parking pawl 11 is not snapped back by the parking gear 12, the locked state can be established and maintained.

According to the present embodiment, the release member 43 is also provided. The release member 43 mechanically cancels the parking state maintained by the second electromagnetic solenoid 42 in the state of power supply failure. Therefore, even in the state of power supply failure, the lock can be canceled (unlocked).

Although an embodiment of the disclosure has been described, the disclosure is not limited to the above-described embodiment, and various modifications are possible. For example, the shapes of the first and second engagement elements 331 and 332 are not limited to those in the above-described embodiment. In addition, for example, the arrangement of the first and second electromagnetic solenoids 41 and 42 is not limited to that in the above-described embodiment.

The system configuration of the above-described embodiment is an example, and the system configuration of the disclosure is not limited to that in the above-described embodiment. For example, the SBW-CU 20 and the electric actuator 15 may be integrated together.

The disclosure may also be applied to a vehicle in which no automatic transmission is mounted. Examples of such a vehicle include an electric vehicle (EV) that directly drives wheels with an electric motor or the like, a fuel cell vehicle (FCV), and a series hybrid electric vehicle (SHEV).

The invention claimed is:

1. An electric parking lock apparatus comprising:
a parking mechanism comprising a parking gear and a parking pawl, the parking mechanism being configured to lock the parking gear by engaging the parking pawl with the parking gear to set a vehicle to a parking state;
an electric actuator configured to swing the parking pawl to lock the parking gear;
an engagement member comprising a first engagement element and a second engagement element in pairs, the first engagement element and the second engagement element being engageable with each other;
a first urging member provided at a distal end of the parking pawl, the first urging member being configured to apply an urging force to the first engagement element so that the first engagement element swings in a direction for engaging with the second engagement element; and
a first electromagnetic solenoid configured to, in an energized state, retain the first engagement element against the urging force of the first urging member so that the first engagement element does not swing,
wherein the first engagement element comprises a proximal end coupled to the first urging member,
wherein the second engagement element comprises a proximal end coupled to a brake pedal of the vehicle,
wherein, in a state of power supply failure, the first electromagnetic solenoid allows the first engagement element to swing in the direction for engaging with the second engagement element in response to the urging force of the first urging member, and
wherein, in the state of power supply failure, the first engagement element and the second engagement element engage with each other in a case where the brake pedal is released from a depressed state, and the parking pawl is caused to swing in a direction for engaging with the parking gear in response to the brake pedal being released from the depressed state.

2. The electric parking lock apparatus according to claim 1,
wherein the first engagement element and the second engagement element comprise respective distal ends that are hook-shaped, and
wherein when respective outer surfaces of the distal ends are in contact with each other, the first engagement element and the second engagement element are movable along respective contact surfaces.

3. The electric parking lock apparatus according to claim 2, further comprising:
a second urging member configured to apply an urging force to the parking pawl in such a direction where the parking pawl moves away from the parking gear; and
a second electromagnetic solenoid configured to, in the energized state, allow the parking pawl to move away from the parking gear in response to the urging force of the second urging member, and in the state of power supply failure, retain the parking pawl in a parking lock state against the urging force of the second urging member.

4. The electric parking lock apparatus according to claim 3, further comprising:
an elastic member that is expandable and contractible, the elastic member being disposed between the proximal end of the first engagement element and the first urging member provided at the distal end of the parking pawl,
wherein a contraction force of the elastic member is greater than the urging force of the second urging member.

5. The electric parking lock apparatus according to claim 4, further comprising:
a release member configured to, in the state of power supply failure, mechanically cancel the parking state maintained by the second electromagnetic solenoid.

6. The electric parking lock apparatus according to claim 3, further comprising:
a release member configured to, in the state of power supply failure, mechanically cancel the parking state maintained by the second electromagnetic solenoid.

7. The electric parking lock apparatus according to claim 2, further comprising:
a release member configured to, in the state of power supply failure, mechanically cancel the parking state maintained by the second electromagnetic solenoid.

8. The electric parking lock apparatus according to claim 1, further comprising:
a second urging member configured to apply an urging force to the parking pawl in such a direction where the parking pawl moves away from the parking gear; and
a second electromagnetic solenoid configured to, in the energized state, allow the parking pawl to move away from the parking gear in response to the urging force of the second urging member, and in the state of power supply failure, retain the parking pawl in a parking lock state against the urging force of the second urging member.

9. The electric parking lock apparatus according to claim 8, further comprising:
an elastic member that is expandable and contractible, the elastic member being disposed between the proximal end of the first engagement element and the first urging member provided at the distal end of the parking pawl,
wherein a contraction force of the elastic member is greater than the urging force of the second urging member.

10. The electric parking lock apparatus according to claim 9, further comprising:
a release member configured to, in the state of power supply failure, mechanically cancel the parking state maintained by the second electromagnetic solenoid.

11. The electric parking lock apparatus according to claim 8, further comprising:
a release member configured to, in the state of power supply failure, mechanically cancel the parking state maintained by the second electromagnetic solenoid.

12. The electric parking lock apparatus according to claim 1, further comprising:

a release member configured to, in the state of power supply failure, mechanically cancel the parking state maintained by the second electromagnetic solenoid.

* * * * *